(12) United States Patent  (10) Patent No.: US 6,845,070 B2
Seo  (45) Date of Patent: Jan. 18, 2005

(54) INITIALIZATION METHOD FOR PHASE CHANGE TYPE OPTICAL DISC

(75) Inventor: Hun Seo, Yongin (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 10/073,841

(22) Filed: Feb. 11, 2002

(65) Prior Publication Data

US 2002/0110069 A1 Aug. 15, 2002

(30) Foreign Application Priority Data

Feb. 13, 2001 (KR) .......................................... 2001-7074

(51) Int. Cl.$^7$ ................................................ G11B 7/00
(52) U.S. Cl. ............................... 369/47.53; 369/53.11; 369/59.11; 369/116
(58) Field of Search ............................. 369/47.1, 47.46, 369/47.5, 47.51, 47.52, 47.53, 47.55, 53.1, 53.11, 53.16, 53.31, 53.37, 53.45, 59.1, 59.11, 116

(56) References Cited

U.S. PATENT DOCUMENTS 6,134,209 A * 10/2000 Den Boef ................. 369/47.53
6,678,220 B1 * 1/2004 Saga ........................ 369/44.27

* cited by examiner

Primary Examiner—Muhammad Edun
(74) Attorney, Agent, or Firm—Lee, Hong, Degerman, Kang & Schmadeka

(57) ABSTRACT

An initialization method for a phase change type optical disc, including the steps of irradiating a laser beam of a predetermined power onto a specimen optical disc, increasing the power of the laser beam with constant rate, detecting a reflectivity of the laser beam reflected from the optical disc in accordance with the increasing laser power, detecting a saturated value of the reflectivity of the laser beam, detecting an optimal power of the laser beam where the reflectivity belongs 70% to 90% of the saturated value, and performing initialization by irradiating the laser beam having thus obtained optimal power onto the optical disc to be initialized which will be initialized with the adjusted laser beam can improve the recording characteristic and erase ratio.

15 Claims, 5 Drawing Sheets

INITIALIZATION METHOD FOR PHASE CHANGE TYPE OPTICAL DISC

BACKGROUND OF THE INVENTION

1. Field of the Invention

The present invention relates to an initialization method for phase change type optical disc and particularly, to capable of improving recording characteristic and erase ratio of an optical disc.

2. Description of the Background Art

Generally, a phase change type optical disc is a kind of optical recording media for repeatedly recording and reproduction information by enabling recording and erasing the information using a reversible transformation of a recording layer.

The phase change type optical disc melts a local area of the recording layer by irradiating the area with concentrated laser beam and transforms an amorphous mark in a crystalline matrix by rapidly cooling the area using a disc structure rapidly designing diffusion of heat. Accordingly, the information is recorded and an amorphous mark is transited to a crystallite by heating the portion in recording information thereafter with a lower power than in the former recording operation, thus to erase the recorded information.

The matrix portion of such phase change type optical disc is transited into a crystallite before recording the information since the step of transiting the crystallite into amorphous is defined as a first step for recording the information. The step of transiting the initial amorphous into crystallite is defined as initialization.

FIG. 1 is a schematic cross-sectional view showing each layer composing a conventional phase change type optical disc and FIG. 2 is a partially enlarged view showing a recording layer of the optical disc in accordance with the conventional initialization method for the phase change type optical disc.

As shown in FIG. 1, the phase change type optical disc 10 includes a substrate 11 which is transparent, has a disk shape and is formed with a member having a predetermined stiffness, a lower dielectric layer 12 formed on the upper surface of the substrate 11 along the thickness direction, a recording layer 13 formed on the upper surface of the lower dielectric layer 12, an upper dielectric layer 14 formed on the upper surface of the recording layer 13 and a reflection layer 15 and protection layer 16 formed on the upper surface of the upper dielectric layer 14.

The substrate 11 is made from glass, plastic and the like which is transparent and have a predetermined stiffness and polycarbonate having an excellent ability of injection molding, for preventing reduction of signal-to-noise ratio (SNR) by briefrengence in case of incident of laser beam is widely used.

The recording layer 13 can be reversely changed between the amorphous state and crystalline state and intermetallic compound of ternary system alloy represented by Ge—Sb—Te is widely used. Recently, Ag—In—B—Te designed to raise erase ratio and signal recording quality at low linear velocity is given more attention.

At the upper side and lower side of the recording layer 13, a dielectric layer for maintaining optical and thermal characteristics is formed and $ZnS$—$SiO_2$ group thin film is used as the lower dielectric layer 12 and upper dielectric layer 14. As the reflection layer 15, thin films of Al alloy, Ag, Au and the like are used to have a proper cooling speed after irradiating with laser beam increasing light reflection amount.

The protection layer 16 formed on the upper surface of the reflection layer 15 is formed by hardening the ultraviolet hardening resin using a ultraviolet lamp after coating the resin to have a predetermined thickness using a spin coater and the like.

On the other hand, the phase change type optical disc 10 having such multilayer structure is initialized to change the amorphous state to crystalline state by irradiating the recording layer 13 with laser beam before recording.

And, when the phase change type optical disc 10 is initialized, the optical signal, that is, reflectivity is changed as the state of the disc is changed to crystalline state. The reflectivity can be increased or decreased according to the thin film designing value of the optical disc but generally the reflectivity is increased.

Namely, in case reflectivity of the phase change type disc 10 is too high after initializing, reflectivity after initialzing is 50% or higher, absorption of energy is decreased and accordingly the recording characteristic is deteriorated with the conventional recording laser beam.

In case reflectivity is too low, that is, in case the reflectivity after initializing is 10% or lower, there can occur problems in tracking of laser beam or degradation of the recording layer 13 can be increased by absorbing excessive amount of energy.

Therefore, taking these problems in consideration, the phase change type optical disc 10 is formed to have 20 to 40% of reflectivity after the conventional initialization. Also, the disc is initialized by increasing the power of the initializing laser beam higher than a predetermined value.

On the other hand, the phase change type optical disc is changed to the crystalline state after initializing and the crystallite has a different grain size distribution according to the reflectivity. The grain size must be uniform with a proper size. When the size is too large or small, the recording characteristic and repeating recording characteristic are deteriorated.

Therefore, it is hard to maintain the proper initializing level in case of initializing as conventionally. Namely, in case the value of reflectivity by the excessive initialization is near from the saturation value which can be occurred in the given thin film structure, a crystal grain 18 having an excessive size is formed in the recording layer 13 as shown in FIG. 2 and accordingly, recording is not performed well or recorded mark is not erased well even if recording is done with a high power, thus to deteriorate the erase ratio.

Also, if the initializing level is too low, recording operation was not performed well since crystallinity of crystallite forming a matrix is low.

SUMMARY OF THE INVENTION

Therefore, the present invention provides an initialization method for a phase change type optical disc capable of improving erase ratio of a mark formerly recorded in case of repeatedly recording, recording characteristic of a recording layer in a disc thin film structure by rapidly providing a proper initialization condition of the phase change type optical disc.

To achieve these and other advantages and in accordance with the purpose of the present invention, as embodied and broadly described herein, there is provided an initialization method for a phase change type optical disc, including the steps of: irradiating a laser beam of a predetermined power onto a specimen optical disc, increasing the power of the laser beam with constant rate, detecting a reflectivity of the laser beam reflected from the optical disc in accordance with the increasing laser power, detecting a saturated value of the reflectivity of the laser beam, detecting an optimal power of the laser beam where the reflectivity belongs 70% to 90% of the saturated value, and performing initialization by irradiating the laser beam having thus obtained optimal power onto the optical disc to be initialized.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
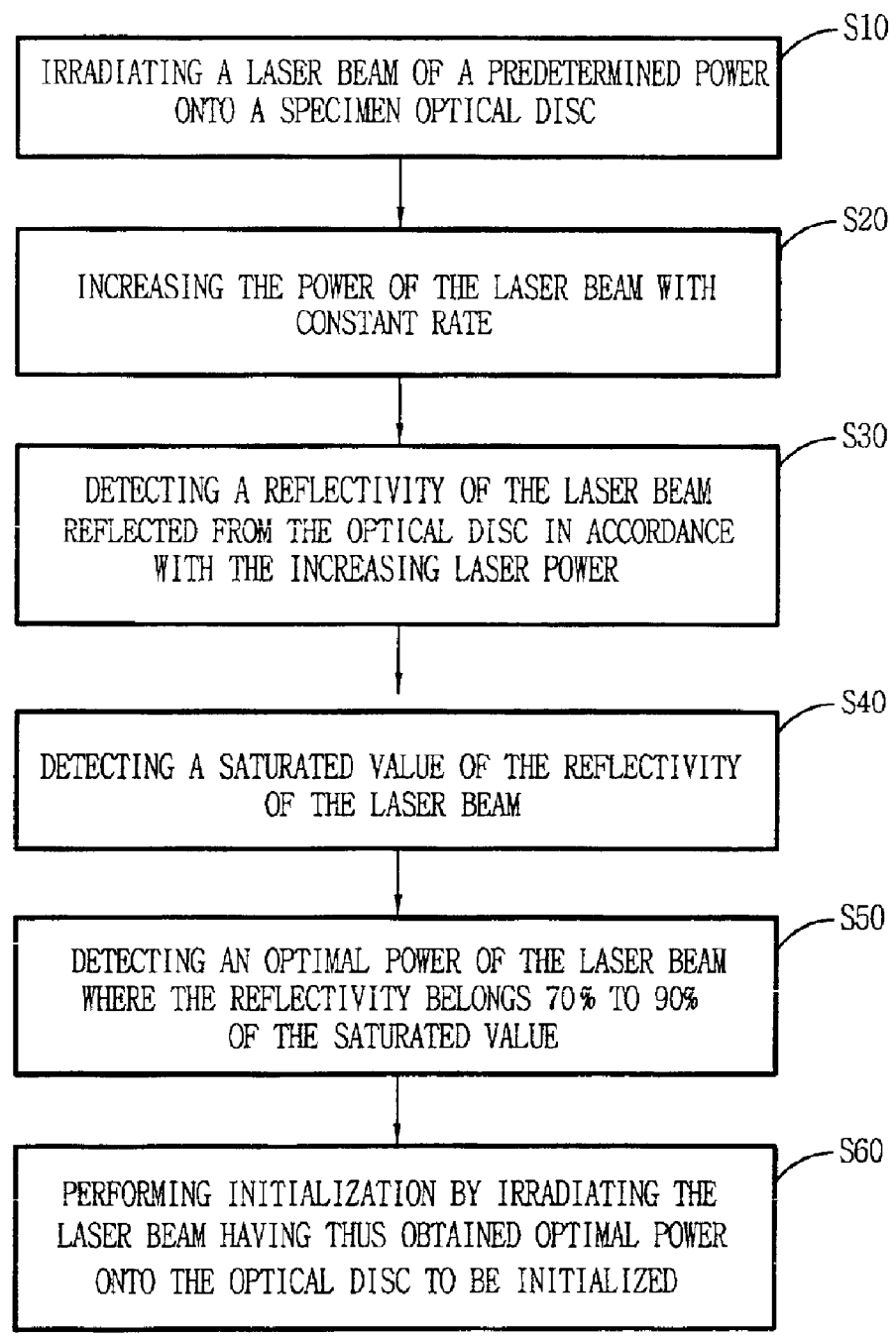
FIG. 3 is a flowchart showing the initialization method for a phase change type optical disc.
Figure 4:
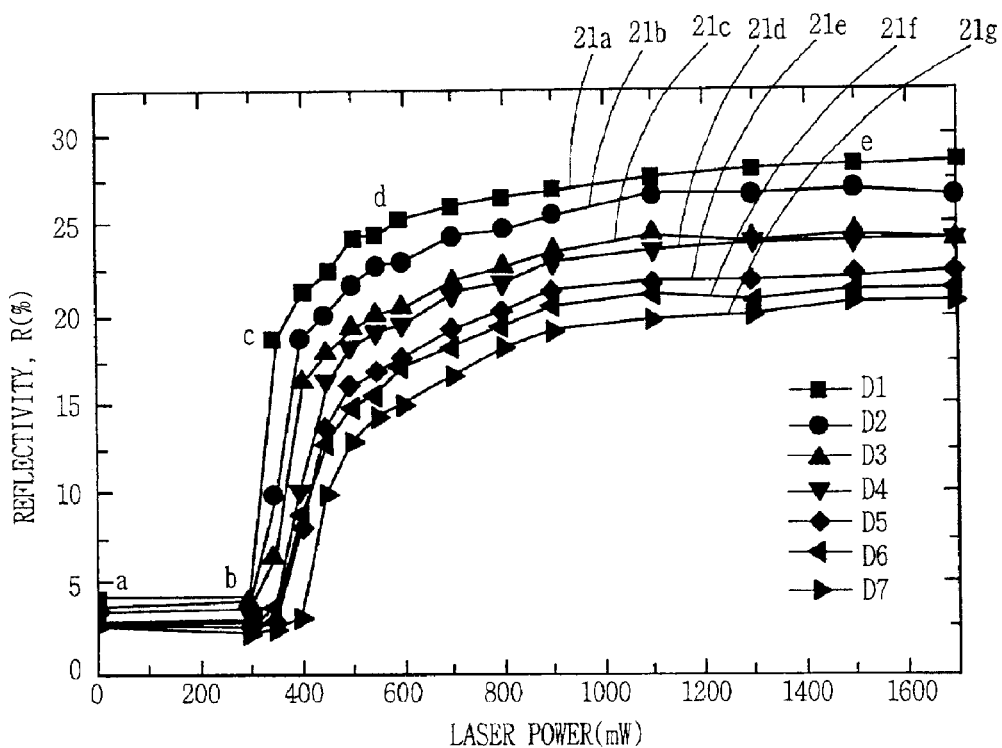
FIG. 4 is a graph showing relations of a laser power and reflectivity of each phase change optical disc in FIG. 3.
Figure 5:
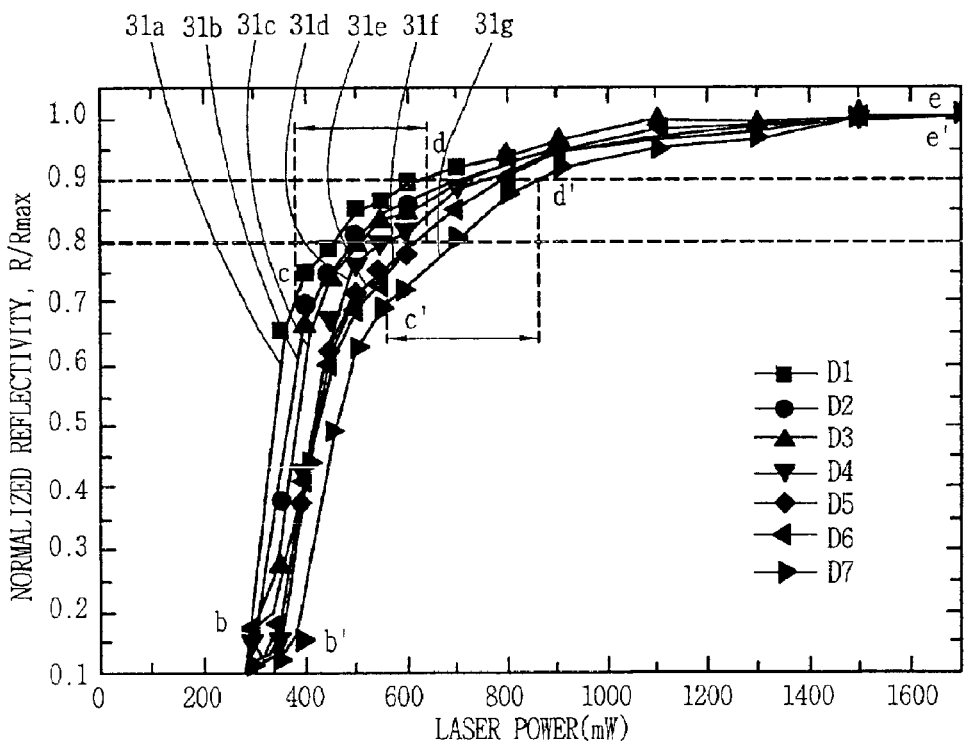
FIG. 5 is a graph showing a change of relative reflectivity according to the laser power.
Figure 6:
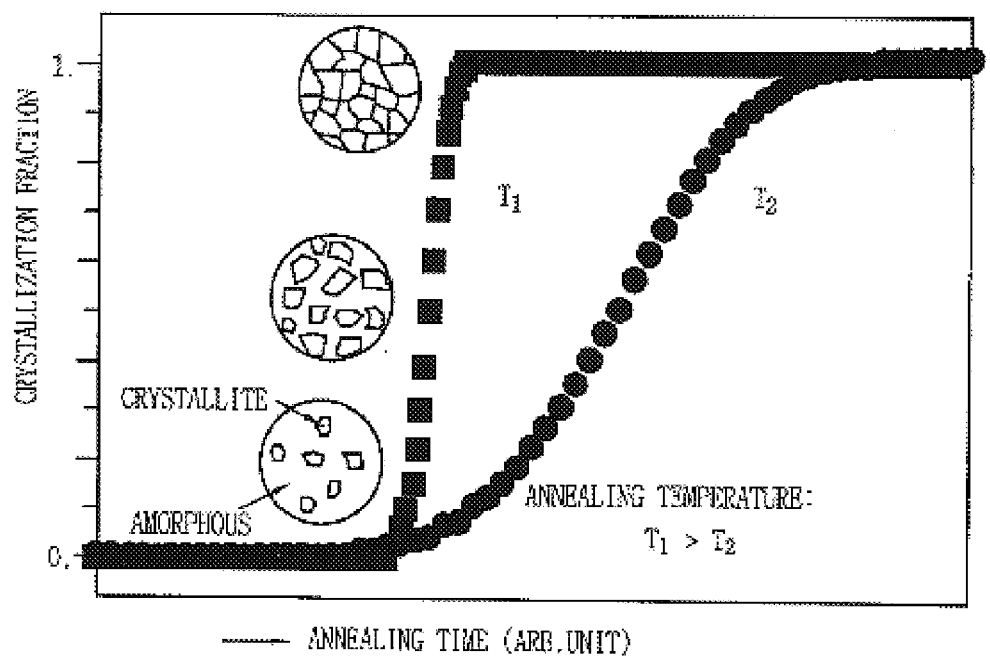
FIG. 6 is a graph showing a change of crystallization fraction according to annealing time of the phase change type optical disc in FIG. 3.
Figure 7:
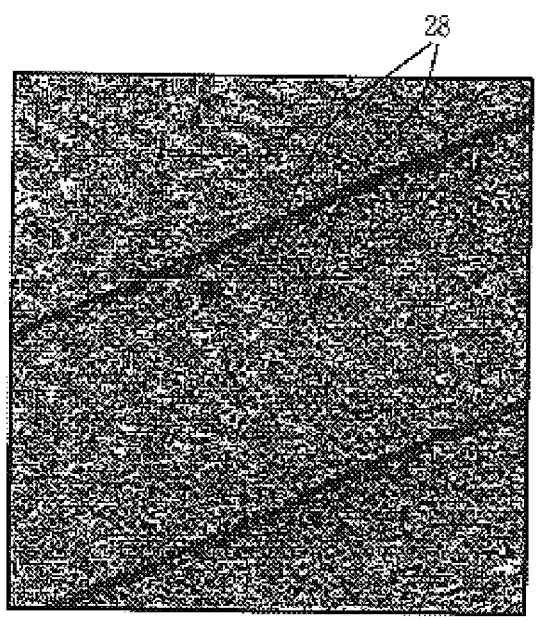
FIG. 7 is a partially enlarged view showing a recording layer of the phase change type optical disc after initialization in accordance with an embodiment of the present invention.

FIG. 3 is a flowchart showing the initialization method for a phase change type optical disc, FIG. 4 is a graph showing relations of a laser power and reflectivity of each phase change optical disc in FIG. 3, FIG. 5 is a graph showing a change of relative reflectivity according to the laser power in FIG. 4, FIG. 6 is a graph typically showing a change of crystallization fraction according to annealing time of the phase change type optical disc in FIG. 3 and FIG. 7 is a partially enlarged view showing a recording layer of the phase change type optical disc after initialization in accordance with an embodiment of the present invention.

As shown in the drawings, the initialization method for a phase change type optical disc in accordance with an embodiment of the present invention includes the steps of irradiating a laser beam of a predetermined power onto a specimen optical disc 10 (S10), increasing the power of the laser beam with constant rate (S20), detecting a reflectivity of the laser beam reflected from the optical disc 10 in accordance with the increasing laser power (S30), detecting a saturated value of the reflectivity of the laser beam (S40), detecting an optimal power of the laser beam where the reflectivity belongs 70% to 90% of the saturated value (50), and performing initialization by irradiating the laser beam having thus obtained optimal power onto the optical disc to be initialized (S60).

In detail, by detecting the reflectivity (R) of each specimen phase change type optical disc respectively initialized with different power levels each other (S30), and connecting each detected reflectivity (R), reflectivity curves 21a to 21g of respective specimen optical disc are obtained as shown in FIG. 4 and saturation value reflectivity (Rmax) of respective specimen phase change type optical discs from the corresponding reflectivity curves 21a to 21g.

D1 to D7 of FIGS. 4 and 5 means a conventional phase change type optical discs having different thin film structures each other.

Here, the reflectivity curve 21a of the optical disc D1 which is a specimen among the reflectivity curves of the phase change type optical discs shown in FIG. 4 will be described in detail.

The recording layer of the first specimen phase change type optical disc D1 has lowest reflectivity (R) in the amorphous state before irradiating the recording layer with laser beam (a) and the reflectivity increases slightly in the term of (a-b).

As the power level of the laser beam increases, the reflectivity R in the term (b-c) increases rapidly and the reflectivity (R) in the term (c-d) increases gradually.

Also, increase in reflectivity (R) in the term d-e relatively slows down and after passing the e position, the reflectivity (R) is not increased any more in spite of increasing the power of laser. At this time, the reflectivity at the e position is the saturation value reflectivity (Rmax) of the first specimen phase change type optical disc D1.

When the saturation value reflectivity of the corresponding specimen phase change type optical discs D1 to D7 to be initialized is detected from the reflectivity curves 21a to 21g of the corresponding specimen phase change type optical disc (S10), the normalized reflectivity (Rn=R/Rmax) is obtained by dividing the reflectivity (R) of the corresponding specimen phase change type optical disc by the detected saturation value reflectivity (Rmax).

On the other hand, the normalized reflectivity curves 31a to 31g as shown in FIG. 5 are formed when the values of the obtained normalized reflectivity (Rn) are smoothly connected.

Also, as shown in FIG. 6, in case of initializing the specimen phase change type optical disc D1 to D7 by irradiating the discs with laser beam having different power levels each other, the composition change of the recording layer according to the power level of laser forms an S-type phase-transforming curve which is transited from the initial amorphous state to crystalline state and in case the annealing temperature is high, the transition speed to be amorphous is faster.

FIG. 6 shows that the phase transition speed is done more swiftly and the phase transition amount of increases when the irradiation energy of the laser beam or the temperature increases.

As shown in FIG. 7, the minute composition of recording layer which was initialized is formed having uniform crystal grain 28 when the value of the normalized reflectivity (Rn) to the saturation value reflectivity is between 0.7 and 0.9.

Figure 1:
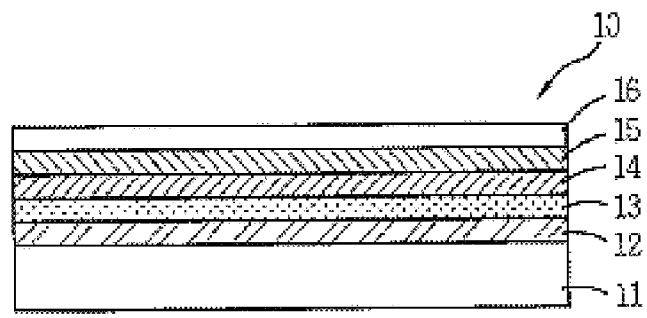
FIG. 1 is a schematic cross-sectional view showing each layer composing a conventional phase change type optical disc.
Figure 2:
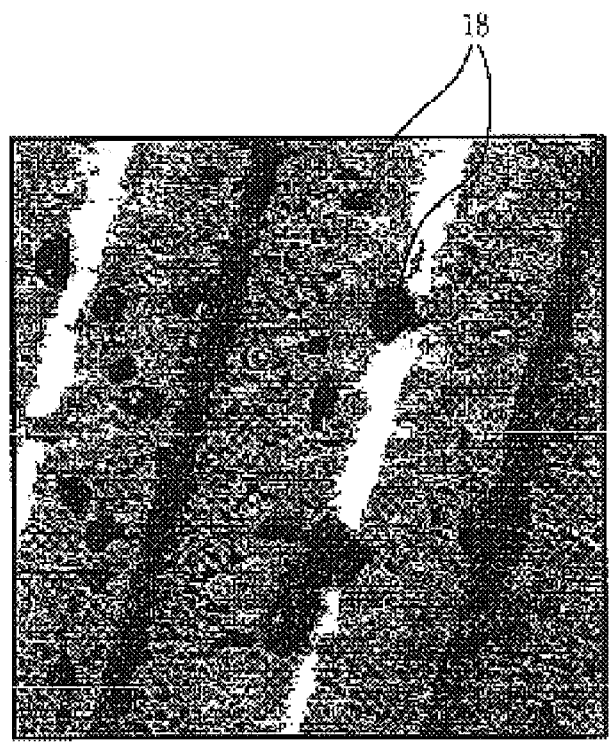
FIG. 2 is a partially enlarged view showing a recording layer of the optical disc in accordance with the conventional initialization method for the phase change type optical disc.

When the value of the normalized reflectivity becomes near to 1, the above described problem occurs by forming excessive amount of crystal grain 18 as shown in FIG. 2. Also, when the normalized reflectivity is lower than 0.7, transformation from amorphous to crystallite is not completely done, thus to deteriorate the recording characteristic.

On the other hand, with the second embodiment in accordance with the present invention, more uniform and denser phase transform of recording layer by limiting the normalized reflectivity to the saturation value reflectivity in the extent between 0.75 and 0.85.

Figure 8:
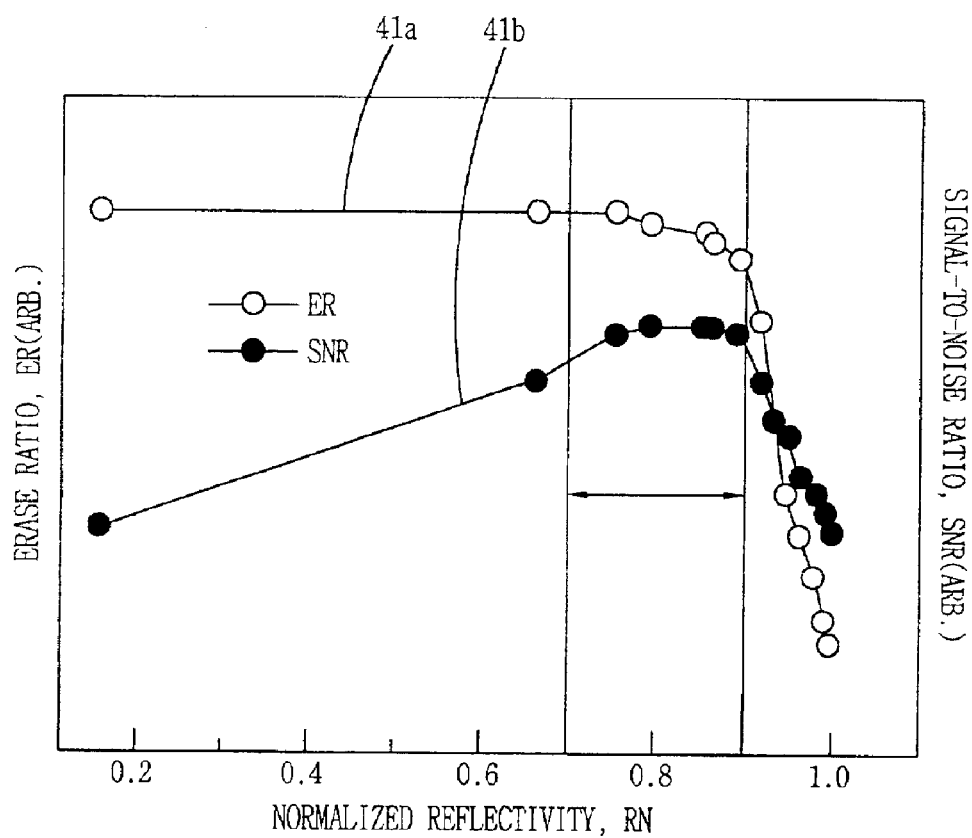
FIG. 8 is a graph showing erase ration and signal-to-noise of each phase change type optical disc in FIG. 3.

On the other hand, FIG. 8 is a view showing the erase ratio and signal-to-noise ratio (SNR) of each phase change type optical disc of FIG. 3.

As shown in FIG. 8, the erase ratio curve 41a increases in the term 0.1 to 0.6 where the gradually normalized reflectivity (Rn) is relatively small and decreased rapidly after the normalized reflectivity (Rn) passes 0.9. Namely, the recording reproduction characteristic and erase characteristic which is a base of the repeating recording characteristic are excellent when the normalized reflectivity is between 0.7 and 0.9. And, above mentioned irradiated laser beam has a wavelength of 450~830 nm.

Therefore, when the saturation value reflectivity (Rmax) is obtained from the corresponding specimen phase change type optical discs (D1 to D7) (S40), the power level of the initializing laser beam is adjusted so that the normalized reflectivity (Rn) of the reflectivity (R) to the corresponding saturation value reflectivity is between 0.7 to 0.9 after initialization of the phase change type optical disc 10 to be initialized (S50) and when the power level of the initializing laser beam is adjusted (S50), the phase change type optical disc 10 is repeatedly initialized (S60).

Hereinafter, the operation effect according to the initialization method for the phase change type optical disc in accordance with the present invention will be described.

As described above, by initializing the phase change type optical disc by detecting the saturation value reflectivity of the phase change type optical disc to be initialized and adjusting the power level of the initializing laser so that the normalized reflectivity of the reflectivity after initialization to saturation value reflectivity of the corresponding phase change type optical disc has a value between 0.7 and 0.9, the initialization method for the phase change type optical disc in accordance with the present invention removes main factors which can deteriorate the recording reproducing signal and particularly erasing characteristic of the former signals in case of repeatedly recording, thus to improve the quality of signal and reliability of the optical disc and enable excellent repeated recording on the disc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An initialization method for a phase change type optical disc which has a sequentially deposited layer structure of a first dielectric layer, a recording layer, a second dielectric layer and a reflective layer on a substrate, comprising the steps of:

irradiating a laser beam of a predetermined power onto a specimen optical disc;

increasing the power of the laser beam with constant rate;

detecting a reflectivity of the laser beam reflected from the optical disc in accordance with the increasing laser power;

detecting a saturated value of the reflectivity of the laser beam;

detecting an optimal power of the laser beam where the reflectivity belongs 70% to 90% of the saturated value; and performing initialization by irradiating the laser beam having thus obtained optimal power onto the optical disc to be initialized.

2. The method of claim 1, wherein the optimal power of the laser beam is determined where the reflectivity belongs 75% to 85% of the saturated value.

3. The method of claim 1, wherein
   the first and second dielectric layers are made of ZnS—SiO$_2$; and
   the recording layer is made of GeSbTe.

4. The method of claim 1, wherein
   the first and second dielectric layers are made of ZnS—SiO$_2$; and
   the recording layer is made of AgInBTe.

5. The method of claim 1, wherein the irradiated laser beam has a wavelength of 450~830 nm.

6. An initialization method for a phase change type optical disc which has a sequentially deposited layer structure of a first dielectric layer, a recording layer, a second dielectric layer and a reflective layer on a substrate, comprising the steps of:

yielding a relationship between a power of an irradiated laser beam and a reflectivity of the laser beam reflected from a specimen optical disc;

detecting a saturated value of the reflectivity;

detecting an optimal power for the initialization where the reflectivity belongs 70% to 90% of the saturated value; and performing initialization by irradiating the laser beam having thus obtained optimal power onto the optical disc to be initialized.

7. The method of claim 6, wherein the optimal power of the laser beam is determined where the reflectivity belongs 75% to 85% of the saturated value.

8. The method of claim 6, wherein the recording layer is made of GeSbTe.

9. The method of claim 6, wherein the recording layer is made of AgInBTe.

10. The method of claim 6, wherein
    the first and second dielectric layers are made of ZnS—SiO$_2$; and
    the recording layer is made of GeSbTe.

11. The method of claim 6, wherein
    the first and second dielectric layers are made of ZnS—SiO$_2$; and
    the recording layer is made of AgInBTe.

12. The method of claim 6, wherein the irradiated laser beam has a wavelength of 450~830 nm.

13. An initialization method for a phase change type optical disc, comprising the steps of:

yielding a relationship between a power of an irradiated laser beam and a reflectivity of the laser beam reflected from a specimen optical disc;

detecting a saturated value of the reflectivity;

detecting an optimal power for the initialization where the reflectivity belongs 70% to 90% of the saturated value; and performing initialization by irradiating the laser beam having thus obtained optimal power onto the optical disc to be initialized.

14. The method of claim 13, wherein the optimal power of the laser beam is determined where the reflectivity belongs 75% to 85% of the saturated value.

15. The method of claim 13, wherein the irradiated laser beam has a wavelength of 450~830 nm.

* * * * *